(12) United States Patent
Takemoto

(10) Patent No.: US 11,680,178 B2
(45) Date of Patent: Jun. 20, 2023

(54) INKJET INK

(71) Applicant: General Co., Ltd., Osaka (JP)

(72) Inventor: Hidehiro Takemoto, Osaka (JP)

(73) Assignee: GENERAL CO., LTD., Osaka (JP)

( * ) Notice: Subject to any disclaimer, the term of this patent is extended or adjusted under 35 U.S.C. 154(b) by 272 days.

(21) Appl. No.: 17/117,887

(22) Filed: Dec. 10, 2020

(65) Prior Publication Data

US 2021/0179874 A1 Jun. 17, 2021

(30) Foreign Application Priority Data

Dec. 17, 2019 (JP) .............................. JP2019-227263

(51) Int. Cl.
- *C09D 11/328* (2014.01)
- *C09D 11/033* (2014.01)
- *C09D 11/037* (2014.01)
- *C09D 11/102* (2014.01)
- *C09D 11/36* (2014.01)

(52) U.S. Cl.
CPC .......... *C09D 11/328* (2013.01); *C09D 11/033* (2013.01); *C09D 11/037* (2013.01); *C09D 11/102* (2013.01); *C09D 11/36* (2013.01)

(58) Field of Classification Search
CPC ... C09D 11/328; C09D 11/033; C09D 11/037; C09D 11/102; C09D 11/36; C09D 11/104
See application file for complete search history.

(56) References Cited

U.S. PATENT DOCUMENTS

| | | |
|---|---|---|
| 4,853,036 A | 8/1989 | Koike et al. |
| 5,594,044 A | 1/1997 | Yang |
| 2008/0178762 A1* | 7/2008 | Vasudevan ............. C09D 11/38 106/31.13 |
| 2012/0212536 A1 | 8/2012 | Saito et al. |
| 2017/0037269 A1 | 2/2017 | Isobe |
| 2017/0073534 A1* | 3/2017 | Ito .............................. B41J 2/00 |
| 2018/0072902 A1* | 3/2018 | Takemoto ................ B41M 5/00 |

FOREIGN PATENT DOCUMENTS

| | | |
|---|---|---|
| EP | 3263660 A1 | 1/2018 |
| JP | S63-132083 A | 6/1988 |
| JP | H07-33110 B2 | 4/1995 |
| JP | 2844655 B2 | 1/1999 |
| JP | 3923105 B2 | 5/2007 |
| JP | 2012-171987 A | 9/2012 |
| JP | 5722576 B2 | 5/2015 |
| JP | 5878224 B2 | 3/2016 |

OTHER PUBLICATIONS

Afine ("Solvent Black 29", 2017). (Year: 2017).*

* cited by examiner

*Primary Examiner* — Robert S Jones, Jr.
*Assistant Examiner* — Jiangtian Xu
(74) *Attorney, Agent, or Firm* — Rabin & Berdo, P.C.

(57) ABSTRACT

The present invention provides an inkjet ink that contains a metal complex dye, a polyoxyethylene based compound with which a number average molecular weight Mn is not less than 200, a tackifier with which a hydroxyl value is 30 to 70 mgKOH/g, a first solvent of at least one type selected from a group consisting of ketones, ethers, and esters and with which an SP value is less than 11, and a second solvent being an alcohol including at least an alcohol with 1 to 3 carbon atoms and with which the SP value is not less than 11 and is solvent based and does not contain (excludes) water, is unlikely to cause cogation, is also excellent in intermittent printing performance, and yet enables a character of excellent fixing property and abrasion resistance to be printed on a surface of a printing object with a non-absorbing property.

5 Claims, No Drawings

INKJET INK

BACKGROUND OF THE INVENTION

1. Field of the Invention

The present invention relates to an inkjet ink.

2. Description of the Related Art

When, for example, a character (including codes such as barcode, etc.; the same applies hereinafter) is printed by an inkjet printing method on a surface of plastic or other printing object with a non-absorbing property, the printed character is generally dried by heating.

However recently, solvent based inkjet inks such as Heatless Ink (registered trademark), etc., with which just an organic solvent is used as the solvent or, even when water is used in combination, an organic solvent is made greater in amount than water to impart a quick drying property and enable a heating drying step to be omitted are coming into practical use.

There are cases where such a solvent based inkjet ink has, for example, a solvent-soluble binder resin blended therein to print a character of excellent fixing property on a printing object with a non-absorbing property.

It is effective to blend in a binder resin to print a character of excellent fixing property on a surface of an aluminum film, corona-treated oriented polypropylene (OPP), polyethylene terephthalate (PET), etc., with which fixing of a character is considered to be especially difficult.

However, when an inkjet ink containing a binder resin is used in a thermal type inkjet printer, there are cases where the binder resin solidifies on a surface of a heating element or vicinity thereof inside a head of the inkjet printer to cause cogation that becomes a cause of a discharge defect.

In particular, inkjet inks that are solvent based and do not contain any water at all tend to easily cause cogation.

For example, use of a polyether such as polyethylene glycol as a binder to take the place of a binder resin is being examined.

With such an arrangement, it is anticipated that by using the polyether described above as the binder, the fixing property of a character can be secured and, at the same time, the occurrence of cogation can be suppressed despite being solvent based because the polyether is lower in molecular weight than an ordinary binder resin.

However, according to examination by the inventor, with just simply combining a polyether with any colorant and a volatile organic solvent having a specific vapor pressure there is a problem in that abrasion resistance of a character is insufficient in particular.

That is, when a printed character is rubbed with a fingertip, etc., the character softens or dissolves due to frictional heat and sebum, etc., and becomes easily blurred or easily removed from a surface of a printing object in some cases.

Also, especially when used in a drop-on-demand type inkjet printer, the inkjet ink described above easily causes blurring, etc., of a character due to becoming clogged in a nozzle when printing is restarted after end of a decap time and has a problem of not being satisfactory in intermittent printing performance.

An object of the present invention is to provide an inkjet ink that is solvent based and does not contain (excludes) water, is unlikely to cause cogation, is also excellent in intermittent printing performance, and yet enables a character of excellent fixing property and abrasion resistance to be printed on a surface of a printing object with a non-absorbing property.

SUMMARY OF THE INVENTION

A preferred embodiment of the present invention provides an inkjet ink that contains a metal complex dye, a polyoxyethylene based compound of at least one type selected from a group consisting of polyoxyalkylene glycols and polyoxyalkylene alkyl ethers and with which a number average molecular weight Mn is not less than 200, a tackifier of at least one type selected from a group consisting of terpene phenol resins and rosin esters and with which a hydroxyl value is not less than 30 mgKOH/g and not more than 70 mgKOH/g, a first solvent of at least one type selected from a group consisting of ketones, ethers, and esters and with which a solubility parameter (SP value) is less than 11, and a second solvent being an alcohol including at least an alcohol with 1 to 3 carbon atoms and with which the solubility parameter (SP value) is not less than 11.

According to this arrangement, the metal complex dye used as a colorant, the polyoxyethylene based compound used as a binder, and the tackifier having a specific hydroxyl value all dissolve satisfactorily in both the first and second solvents and especially in the first solvent.

Also, the polyoxyethylene based compound is a polyether of lower molecular weight than an ordinary binder resin, and also the tackifier is the terpene phenol resin and/or rosin ester that are of lower molecular weight than an ordinary binder resin.

Therefore, between a stage before printing to immediately after printing on a surface of a printing object, these components are uniformly and stably dissolved mainly by the first solvent and without causing precipitation inside the inkjet ink.

Therefore, even when used, for example, in a thermal type inkjet printer, cogation is made unlikely to be caused and the inkjet ink can be discharged stably from a nozzle of the inkjet printer.

Also, inside the inkjet ink printed on the surface of the printing object, precipitation of the metal complex dye, the polyoxyethylene based compound, and the tackifier starts at substantially the same time as start of volatilization of the solvents and as the solvents volatilize gradually, the precipitation of these components also proceeds gradually.

Then, on the surface of the printing object, these gradually precipitating components aggregate slowly such that on the surface, the metal complex dye becomes bound with the polyoxyethylene based compound as the binder and a character that is firmly fixed by a tackiness of the tackifier is formed.

Specifically, it is presumed that by the polyoxyethylene based compound taking on a structure coordinated such as to surround the metal ion inside the metal complex dye, the both things become bound firmly and further, the structure becomes firmly fixed to the surface of the printing object by the tackiness of the tackifier.

A character that is better in fixing property and abrasion resistance than is achievable presently can thus also be printed, especially on the surface of the corona-treated OPP, etc., mentioned above.

Moreover, the tackifier also contributes to improving intermittent printing performance of the inkjet ink.

That is, clogging in a nozzle of an inkjet printer during a decap time of printing to cause blurring, etc., of a character at restart of printing can be suppressed.

The decap time refers to a time during which the inkjet ink inside the nozzle that, among nozzles provided in plurality in the inkjet printer, is put in a standby state in which ink droplets are not discharged in accordance with a printing pattern during intermittent printing is exposed to ambient air.

In general, an inkjet printer is ordinarily provided with a function of closing (capping) a nozzle during operation stoppage such as to prevent an inkjet ink inside the nozzle from being continuously exposed to the ambient air to become dry and cause clogging, etc.

However, during printing, the capping is released.

Therefore, especially with a nozzle that is put in the standby state during intermittent printing, a state in which the nozzle is not closed (state of decap) is sustained until ink droplets are discharged subsequently and during this state, the inkjet ink inside the nozzle continues to be exposed to the ambient air.

There is thus a tendency that the longer the time described above, that is, the longer the decap time, the more likely it is that clogging of the nozzle would be caused.

A characteristic of clogging of the nozzle being unlikely to be caused during the decap time is evaluated as the "intermittent printing performance" being satisfactory or poor. The longer the decap time during which clogging is not caused, the more the inkjet ink can be evaluated to be satisfactory in intermittent printing performance.

With the present invention, the tackifier having the specific hydroxyl value mentioned above is dissolved inside the inkjet ink in a marginal state without allowance in solubility by the solvents of the two types of first and second that differ in SP value.

However, when in the decap time, the inkjet ink becomes exposed, inside the nozzle, to the ambient air, the tackifier precipitates due to an action of moisture in the ambient air at an interface with the ambient air, that is, a liquid surface (meniscus) of the inkjet ink inside the nozzle and forms an extremely thin film on the liquid surface.

Then, by the thin film that is formed, further volatilization of the solvents is suppressed and the inkjet ink at an inner side of the film is maintained in a dischargeable, low viscosity state during the decap time.

Moreover, the tackifier is a hard, brittle component with hardly any film formability, the film constituted of the tackifier is easily broken by a discharge pressure applied to the nozzle when discharge is performed next, and the broken film dissolves rapidly into the inkjet ink.

An ink droplet of a predetermined volume can thus be discharged from immediately after the decap time and consequently, the intermittent printing performance can be improved.

Incidentally, even if just the second solvent that is the alcohol with the SP value of not less than 11 is used as the solvent, the intermittent printing performance can be improved by the mechanism described above in some cases by increasing an amount of the tackifier.

However, for this purpose, a tackifier with which the hydroxyl value exceeds 70 mgKOH/g must be used.

Such a tackifier of high hydroxyl value is high in solubility with respect to water and therefore, unless its amount is increased as mentioned above, the effect of forming the film on the liquid surface to improve the intermittent printing performance cannot be obtained.

Moreover, if the amount of tackifier is increased, cogation may be easily caused in some cases.

On the other hand, by using the first solvent with the SP valueless than 11 and the second solvent in combination as the solvent, the film can be formed on the liquid surface to improve the intermittent printing performance even by using a small amount of the tackifier with the hydroxyl value of not more than 70 mgKOH/g.

Also, since the amount of the tackifier can be made small, the occurrence of cogation can be suppressed.

In the preferred embodiment of the present invention, the polyoxyethylene based compound has a number average molecular weight Mn of not less than 800 and not more than 4000.

According to this arrangement, since the polyoxyethylene based compound with the number average molecular weight Mn not less than the range mentioned above has an especially high film formability and is even more unlikely to cause stickiness, a character that is more excellent in the characteristics mentioned above can be printed.

Also, the polyoxyethylene based compound with the number average molecular weight Mn not more than the range mentioned above is excellent in solubility inside the inkjet ink and can thus suppress the occurrence of precipitation and the causing of cogation more effectively.

In the preferred embodiment of the present invention, an amount of the polyoxyethylene based compound is not less than 2 mass % and not more than 60 mass % with respect to an amount of the metal complex dye.

According to this arrangement, the abrasion resistance of a character can be improved further.

In the preferred embodiment of the present invention, an amount of the tackifier is not less than 0.5 mass % and not more than 5 mass % in a total amount of the inkjet ink.

According to this arrangement, the intermittent printing performance of the inkjet ink can be improved further while suppressing the decreases in abrasion resistance, alcohol resistance, and continuous printing performance and the occurrence of cogation.

In the preferred embodiment of the present invention, an amount of the first solvent is not less than 4 mass % and not more than 42 mass % in a total amount of the first solvent and the second solvent.

According to this arrangement, the solubility of the metal complex dye, etc., inside the inkjet ink can be improved to satisfactorily suppress precipitation and cogation from occurring.

Also, material compatibility of the inkjet ink can be improved to satisfactorily suppress the occurrence of the various defects mentioned above due to erosion and dissolution of a member constituting the head, etc.

Further, when the inkjet ink is used in a thermal type inkjet printer and heated, bubbles can be formed satisfactorily to discharge appropriate ink droplets.

In the preferred embodiment of the present invention, an amount of the metal complex dye is not less than 5 mass % and not more than 15 mass % in a total amount of the inkjet ink.

According to this arrangement, the fixing property, the abrasion resistance, etc., of a character formed on a surface of a printing object can be improved while coloring the inkjet ink to any shade of color and color density.

In the preferred embodiment of the present invention, an amount of the metal complex dye is not less than 7 mass % and not more than 12 mass % in a total amount of the inkjet ink, an amount of the polyoxyethylene based compound is not less than 3 mass % and not more than 55 mass % with respect to the amount of the metal complex dye, an amount of the tackifier is not less than 1 mass % and not more than 4 mass % in a total amount of the inkjet ink, and an amount of the first solvent is not less than 5 mass % and not more than 40 mass % in a total amount of the first solvent and the second solvent.

According to this arrangement, the effects due to combining the respective components described above can be improved further to provide an inkjet ink that is solvent based and does not contain water, is even more unlikely to cause cogation, is also excellent in intermittent printing performance, and yet enables a character of especially excellent fixing property and abrasion resistance to be printed on a surface of a printing object with a non-absorbing property.

DETAILED DESCRIPTION OF THE PREFERRED EMBODIMENTS

An inkjet ink according to a preferred embodiment of the present invention is characterized in containing a metal complex dye, a polyoxyethylene based compound of at least one type selected from a group consisting of polyoxyalkylene glycols and polyoxyalkylene alkyl ethers and with which a number average molecular weight Mn is not less than 200, a tackifier of at least one type selected from a group consisting of terpene phenol resins and rosin esters and with which a hydroxyl value is not less than 30 mgKOH/g and not more than 70 mgKOH/g, a first solvent of at least one type selected from a group consisting of ketones, ethers, and esters and with which a solubility parameter (SP value) is less than 11, and a second solvent being an alcohol including at least an alcohol with 1 to 3 carbon atoms and with which the solubility parameter (SP value) is not less than 11.

Thereby, an inkjet ink that, by the mechanisms described above, is solvent based and does not contain water, is unlikely to cause cogation, is also excellent in intermittent printing performance, and yet enables a character of excellent fixing property and abrasion resistance to be printed on a surface of a printing object with a non-absorbing property can be provided.

<Metal Complex Dye>

As the metal complex dye, various metal complex dyes that dissolve in both the first solvent and the second solvent can be used.

Although not restricted thereto, for example, the following various dyes can be cited as specific examples of the metal complex dye.

(Yellow)

C. I. solvent yellow 19, 21, 25, 32, 41, 61, 62, 65, 79, 81, 82, 83, 83:1, 88, 89, 90, and 151; VALIFAST (registered trademark) YELLOW 3108, 3120, 3150, 3170, 3180, 4120, and 4121 manufactured by Orient Chemical Industries Co., Ltd.; Neo SuperColor Yellow C-131 manufactured by Chuo Synthetic Chemical Co., Ltd.; Oleosol (registered trademark) Fast Yellow 2G and GCN manufactured by Taoka Chemical Co., Ltd.; Orasol (registered trademark) Yellow 141, 152, 157, and 190 manufactured by BASF Japan Ltd.; Intraplast Yellow 2GLN and 3R manufactured by Sensient Technologies Corp.; and Savinyl Yellow 2GLS01, RLS, RLSN, and 2RLS manufactured by Clariant AG.

(Orange)

C. I. solvent orange 5, 6, 11, 20, 41, 54, 56, 58, 59, 62, and 99; VALIFAST ORANGE 2210, 3208, 3209, and 3210 manufactured by Orient Chemical Industries Co., Ltd.; Neo Super Color Orange C-232 manufactured by Chuo Synthetic Chemical Co., Ltd.; Orasol Orange 245, 247, 251, and 272 manufactured by BASF Japan Ltd.; Intraplast Orange G and RLN manufactured by Sensient Technologies Corp.; and Savinyl Orange RLS and RLSE manufactured by Clariant AG.

(Red)

C. I. solvent red 8, 91, 99, 100, 102, 109, 118, 119, 122, 124, 125, 127, 130, 132, 142, 160, 218, and 233; VALIFAST Red 2303, 2320, 3304, 3306, 3311, 3312, and 3320 and PINK 2310N manufactured by Orient Chemical Industries Co., Ltd.; Neo Super Color RED C-431 and PINK C-331 manufactured by Chuo Synthetic Chemical Co., Ltd.; Oleosol Fast RED BL and PINK FB manufactured by Taoka Chemical Co., Ltd.; Orasol Red 330, 335, 355, 363, 365, 385, 395, and 471 and Pink 478 manufactured by BASF Japan Ltd.; Intraplast Red GC and Scarlet 3GL manufactured by Sensient Technologies Corp.; and Savinyl Red 3BLS and 3GLS and Pink 6BLS manufactured by Clariant AG.

(Brown)

C. I. solvent brown 37, 42, 43, and 44; Orasol Brown 324 and 326 manufactured by BASF Japan Ltd.; and Intraplast Brown GC manufactured by Sensient Technologies Corp.

(Blue)

C. I. solvent blue 24, 25, 38, 44, 45, 55, 64, 67, and 70; VALIFAST Blue 2606, 2620, and 2670 manufactured by Orient Chemical Industries Co., Ltd.; Neo Super Color Blue C-555 manufactured by Chuo Synthetic Chemical Co., Ltd.; Orasol Blue 825 and 855 manufactured by BASF Japan Ltd.; Intraplast Blue GN manufactured by Sensient Technologies Corp.; and Savinyl Blue RS and GLS manufactured by Clariant AG.

(Black)

C. I. solvent black 22, 27, 28, 29, 34, 35, and 43; VALIFAST BLACK 3804, 3807, 3808, 3810, 3820, 3830, 3840, 3866, 3870, 3877, and 3878 manufactured by Orient Chemical Industries Co., Ltd.; Neo Super Color Black C-832 manufactured by Chuo Synthetic Chemical Co., Ltd.; Orasol Black X45, X51, and X55 manufactured by BASF Japan Ltd.; Intraplast Black CN and RLS manufactured by Sensient Technologies Corp.; and Savinyl Black RLSN01 manufactured by Clariant AG.

One type or two or more types of the metal complex dye can be blended in appropriate amounts in accordance with a shade of color and color density of the inkjet ink.

However, an amount of the metal complex dye in a total amount of the inkjet ink is preferably not less than 5 mass % and especially preferably not less than 7 mass % and preferably not more than 15 mass % and especially preferably not more than 12 mass %.

Here, the amount mentioned above when just one type of metal complex dye is used is the amount of the just one type of metal complex dye and that when two or more types are used in combination is a total amount of the two or more types of metal complex dyes.

According to examination by the inventor, even among oil-soluble dyes that are solvent-soluble, the effects of the present invention are expressed specifically just in the metal complex dyes.

That is, other oil-soluble dyes besides the metal complex dyes cannot form the structure where the polyoxyethylene based compound is coordinated as mentioned above and therefore do not precipitate or aggregate together with the polyoxyethylene based compound and the tackifier and do not become fixed firmly on a surface of a printing object.

Therefore, an effect of improving the fixing property, the abrasion resistance, etc., of a character formed on a surface of a printing object cannot be obtained with the other oil-soluble dyes besides the metal complex dyes.

<Polyoxyethylene Based Compound>

As the polyoxyethylene based compound, various compounds that are of at least one type selected from a group consisting of polyoxyalkylene glycols and polyoxyalkylene alkyl ethers, have a number average molecular weight Mn is not less than 200, and can be used as a binder can be cited.

As the polyoxyethylene based compound, for example, one type or two or more types among polyethylene glycols, polyoxyethylene alkyl ethers having a structure in which a polyoxyethylene chain and an alkyl group are ether bonded 〈hereinafter mentioned at times by the synonym, "alcohol ethoxylates"〉, and polyoxyethylene polyoxypropylene glycols each being a block or random copolymer of ethylene oxide (EO) and propylene oxide (PO) 〈hereinafter abbreviated at times as "poloxamer" that is a synonym of a representative block copolymer〉, etc.

can be cited.

Although not restricted thereto, for example, one type or two or more types of the following various compounds can be cited as specific examples of the polyoxyethylene based compound.

(Polyethylene Glycols)

PEG-200 〈number average molecular weight Mn: 200〉, PEG-300 〈number average molecular weight Mn: 300〉, PEG-400 〈number average molecular weight Mn: 400〉, PEG-600 〈number average molecular weight Mn: 600〉, PEG-1000 〈number average molecular weight Mn: 1000〉, PEG-1500 〈number average molecular weight Mn: 570〉, PEG-1540 〈number average molecular weight Mn: 1500〉, PEG-4000 〈number average molecular weight Mn: 3000〉, PEG-6000 〈number average molecular weight Mn: 8300〉, and PEG-20000 〈number average molecular weight Mn: 20000〉 of the ADEKA (registered trademark) PEG series manufactured by ADEKA Corp.

200 〈number average molecular weight Mn: 200〉, 300 〈number average molecular weight Mn: 300〉, 400 〈number average molecular weight Mn: 400〉, 600 〈number average molecular weight Mn: 600, 1000 〈number average molecular weight Mn: 1000〉, 1500 〈number average molecular weight Mn: 570〉, 1540 〈number average molecular weight Mn: 1500〉, 2000 〈number average molecular weight Mn: 2000〉, 4000 〈number average molecular weight Mn: 3000〉, and 6000 〈number average molecular weight Mn: 8300〉 of the Toho Polyethylene Glycol series manufactured by TOHO Chemical Industry Co., Ltd.

(Alcohol Ethoxylates)

Polyoxyethylene lauryl ether bridge 35 〈number average molecular weight Mn: 1200〉 manufactured by Junsei Chemical Co., Ltd.

DKS-NL15 〈number average molecular weight Mn: 2900〉 manufactured by DKS Co., Ltd.

(Poloxamers)

PE-61 〈POE (5) POP (30)〉, PE-62 〈POE (10) POP (30)〉, PE-71 〈POE (5) POP (35)〉, PE-74 〈POE (30) POP (35)〉, and PE-75 〈POE (48) POP (35)〉 of the NEWPOL (registered trademark) PE series manufactured by Sanyo Chemical Industries, Ltd.

L-31 (POE (3) POP (17)), L-34 (POE (16) POP (17)), L-61 (POE (5) POP (30)), L-62 (POE (10) POP (30)), L-101 (POE (8) POP (55)), and L-121 (POE (10) POP (65)) of the ADEKA PLURONIC (registered trademark) L series, F-68 (POE (160) POP (30)), F-87 (POE (120) POP (40)), and F-127 (POE (196) POP (67)) of the ADEKA PLURONIC F series, and P-85 (POE (54) POP (39)) and P-123 (POE (42) POP (67)) of the ADEKA PLURONIC P series manufactured by ADEKA Corp.

P188 〈POE (160) POP (30)〉 and P407 〈POE (196) POP (67)〉 of the Kolliphor series and F68 〈POE (160) POP (30)〉 and F127 〈POE (196) POP (67)〉 of the Lutrol series manufactured by BASF Japan Ltd.

These polyoxyethylene based compounds are compounds that are ordinarily used as nonionic surfactants or raw materials, etc., thereof and are compounds of lower molecular weight than ordinary binder resins that easily cause cogation.

Incidentally, as other binders that do not easily cause cogation, use, for example, of acetylene glycol and other low molecular compounds besides polyoxyethylene based compounds can be considered.

However, these other compounds are low in film formability in comparison to polyoxyethylene based compounds and therefore in some cases do not enable printing of a character of excellent fixing property and abrasion resistance on a surface of a printing object and also cause stickiness such that a quick drying property after printing is decreased.

On the other hand, the polyoxyethylene based compounds have a high film formability and are unlikely to cause stickiness.

Therefore, by combining the polyoxyethylene based compound with both the first and second solvents it becomes possible, by the mechanisms described above, to print a character that is excellent in fixing property, abrasion resistance, and quick drying property on a surface of a printing object without causing cogation.

Among the above, the polyoxyethylene based compound of a number average molecular weight Mn of not less than 400 is preferable, that of not less than 600 is more preferable, and that of not less than 800 is especially preferable.

The polyoxyethylene based compound with a number average molecular weight Mn less than this range is still insufficient in film formability and in some cases does not enable printing of a character of excellent fixing property and abrasion resistance on a surface of a printing object or causes stickiness such that the quick drying property after printing is decreased.

On the other hand, the polyoxyethylene based compound with a number average molecular weight Mn not less than the range mentioned above has an especially high film formability and is even more unlikely to cause stickiness and therefore enables a character that is more excellent in the characteristics mentioned above to be printed.

However, even within the range mentioned above, the number average molecular weight Mn of the polyoxyethylene based compound is preferably not more than 5000 and is especially preferably not more than 4000.

The polyoxyethylene based compound with a number average molecular weight Mn that exceeds this range is too large and is thus decreased in solubility inside the inkjet ink and, for example, tends to easily precipitate during storage of the inkjet ink or easily cause cogation during printing.

On the other hand, the polyoxyethylene based compound with a number average molecular weight Mn that is not more than the range mentioned above is excellent insolubility inside the inkjet ink and can thus suppress the occurrence of precipitation and the causing of cogation more effectively.

Although not restricted thereto, for example, the following various compounds can be cited as especially preferable polyoxyethylene based compounds with which, even in the range mentioned above, the number average molecular weight Mn is in a range of not less than 800 and not more than 4000.

PEG-1000 ⟨number average molecular weight Mn: 1000⟩, PEG-1540 ⟨number average molecular weight Mn: 1500⟩, and PEG-4000 ⟨number average molecular weight Mn: 3000⟩ of the ADEKA PEG series.

1000 ⟨number average molecular weight Mn: 1000⟩, 1540 ⟨number average molecular weight Mn: 1500⟩, 2000 ⟨number average molecular weight Mn: 2000⟩, and 4000 ⟨number average molecular weight Mn: 3000⟩ of the Toho Polyethylene Glycol series.

Polyoxyethylene lauryl ether bridge 35 ⟨number average molecular weight Mn: 1200⟩ manufactured by Junsei Chemical Co., Ltd.

DKS-NL15 ⟨number average molecular weight Mn: 2900⟩ manufactured by DKS Co., Ltd.

L-31 ⟨number average molecular weight Mn: 1100, POE content: 10%⟩, L-61 ⟨number average molecular weight Mn: 2000, POE content: 10%⟩, L-62 ⟨number average molecular weight Mn: 2500, POE content: 20%⟩, and L-101 ⟨number average molecular weight Mn: 3800, POE content: 10%⟩ of the ADEKA PLURONIC L series.

One type or two or more types of these polyoxyethylene based compounds can be used.

An amount of the polyoxyethylene based compound with respect to the amount of the metal complex dye is preferably not less than 2 mass % and especially preferably not less than 3 mass % and preferably not more than 60 mass % and especially preferably not more than 55 mass %.

If the amount of the polyoxyethylene based compound is either less than this range or exceeds this range, the abrasion resistance of a character decreases in some cases.

<Tackifier>

As the tackifier, at least one type of compound selected from a group consisting of terpene phenol resins and rosin esters and with which a hydroxyl value is not less than 30 mgKOH/g and not more than 70 mgKOH/g is used.

The hydroxyl values of both the terpene phenol resins and rosin esters each to be used as the tackifier are restricted to the above range due to the following reasons.

That is, a tackifier with which the hydroxyl value is less than 30 mgKOH/g is too low in polarity and is thus insufficient in solubility with respect to both the first and second solvents and cannot be dissolved satisfactorily inside the inkjet ink in some cases.

Therefore in some cases, discharge becomes unstable such that continuous printing performance is easily decreased or intermittent printing performance is insufficient and clogging of a nozzle is easily caused during a decap time.

On the other hand, a tackifier with which the hydroxyl value exceeds 70 mgKOH/g is high in solubility not just with respect to the solvents but also with respect to water and therefore the effects of improving the intermittent printing performance by the mechanism described above cannot be obtained in some cases.

That is, the tackifier with which the hydroxyl value exceeds 70 mgKOH/g is high in polarity and can thus be dissolved satisfactorily in the solvent mixture and the continuous printing performance is improved.

However, such a tackifier is also high in solubility with respect to water and therefore, even when the inkjet ink is exposed to ambient air inside the nozzle and contacts moisture in the ambient air, cannot precipitate rapidly on the liquid surface and form a satisfactory film capable of suppressing volatilization of the solvents.

A viscosity of the inkjet ink thus increases during the decap time such as to easily cause clogging of the nozzle and the intermittent printing performance decreases in some cases.

Also, especially if a surface of a printing object is constituted of plastic, etc., that is nonporous and low in polarity, an adhesive property of a character tends to decrease easily.

Moreover, there is also a problem in that tackifiers with a high hydroxyl value such as mentioned above are special, few in type, and restricted in choices of characteristics as described above.

On the other hand, tackifiers with which the hydroxyl value is within the range mentioned above are numerous in type, are abundant in choices of characteristics, have appropriate solubilities that are neither too low nor too high with respect to the two types of the first and second solvents differing in SP value, and can be dissolved satisfactorily inside the inkjet ink.

Therefore, the continuous printing performance of the inkjet ink can be improved, the intermittent printing performance can be improved as well, and clogging of the nozzle during the decap time can also be made unlikely to be caused.

Further, the adhesive property of a character can be secured sufficiently even on a surface of a printing object constituted of plastic, etc., of low polarity.

As the terpene phenol resins, various terpene phenol resins each being a copolymer of terpene and a phenol having a basic skeleton $(C_5H_8)_p$ (where p is an integer) with isoprenes bonded head-to-tail successively and with which the hydroxyl value is within the range mentioned above can be used.

Although not restricted thereto, for example, the following various compounds can be cited as specific examples of the terpene phenol resins.

U115 ⟨hydroxyl value: 30 mgKOH/g⟩, T80 ⟨hydroxyl value: 60 mgKOH/g⟩, T100 ⟨hydroxyl value: 60 mgKOH/g⟩, T115 ⟨hydroxyl value: 60 mgKOH/g⟩, T130 ⟨hydroxyl value: 60 mgKOH/g⟩, and T145 ⟨hydroxyl value: 60 mgKOH/g⟩ of the YS Polyster series manufactured by Yasuhara Chemical Co., Ltd.

TP95 ⟨hydroxyl value: 40 mgKOH/g⟩, TP105 ⟨hydroxyl value: 40 mgKOH/g⟩, and TP115 ⟨hydroxyl value: 50 mgKOH/g⟩ of the SYLVARES (registered trademark) series manufactured by Arizona Chemical Ltd.

Also, as the rosin esters, various rosin esters each being an ester of a rosin mainly constituted of an abietene type or pimarene type resin acid that is a monobasic carboxylic acid with an alkylated hydrophenanthrene nucleus and an alcohol and with which the hydroxyl value is within the range mentioned above can be used.

Here, as the rosin, for example, that constituted of abietic acid, dextropimaric acid, or other resin acid containing an unsaturated bond, a hydrogenated rosin mainly constituted of dihydroabietic acid or tetrahydroabietic acid, etc., that is hydrogenated, and so forth can be cited. Also, as the alcohol, for example, glycerol, pentaerythritol, or triethylene glycol, etc., can be cited.

Although not restricted thereto, for example, the following various compounds can be cited as specific examples of the rosin esters.

PENSEL (registered trademark) D-125 ⟨hydroxyl value: 30 mgKOH/g⟩ and PINECRYSTAL (registered trademark) KE-359 ⟨hydroxyl value: 43 mgKOH/g⟩ manufactured by Arakawa Chemical Industries, Ltd.

At least one type of these tackifiers can be used.

An amount of the tackifier in the total amount of the inkjet ink is preferably not less than 0.5 mass % and especially preferably not less than 1 mass % and preferably not more than 5 mass % and especially preferably not more than 4 mass %.

If the amount of the tackifier is less than this range, a satisfactory film capable of sufficiently suppressing the volatilization of the solvents when the inkjet ink is exposed to the ambient air inside the nozzle during the decap time does not form and the viscosity of the inkjet ink increases and the intermittent printing performance decreases in some cases.

On the other hand, if the amount of the tackifier exceeds the range mentioned above, the abrasion resistance and an alcohol resistance of a character decreases in some cases due to the tackifier hardly having any film formability as mentioned above.

Also, due to the viscosity of the inkjet ink increasing and the discharge becoming unstable, the continuous printing performance decreases or cogation is easily caused in some cases.

On the other hand, by setting the amount of the tackifier to be within the range mentioned above, the intermittent printing performance of the inkjet ink can be improved further while suppressing the decreases in abrasion resistance, alcohol resistance, and continuous printing performance and the occurrence of cogation.

If two or more types of the tackifier are to be used in combination, a total amount thereof should be set within the range mentioned above.

<First Solvent>

As mentioned above, as the first solvent, various solvents that are of at least one type selected from the group consisting of ketones, ethers, and esters and with which the SP value is less than 11 are used.

Although not restricted thereto, for example, one type or two or more types of the following various ketones can be cited as specific examples of a ketone.

2-butanone ⟨methyl ethyl ketone (MEK); number of carbon atoms: 4; SP value: 9.3⟩, acetone ⟨dimethyl ketone; number of carbon atoms: 3; SP value: 10⟩, 2-pentanone ⟨methyl propyl ketone (MPK); number of carbon atoms: 5; SP value: 8.7⟩, 3-pentanone ⟨diethyl ketone (DEK); number of carbon atoms: 5; SP value: 8.8⟩, 3-methyl-2-butanone ⟨methyl isopropyl ketone (MIPK); number of carbon atoms: 5; SP value: 8.5⟩, 2-methyl-4-pentanone ⟨methyl isobutyl ketone (MIBK); number of carbon atoms: 6; SP value: 8.4⟩, 2,6-dimethyl-4-heptanone ⟨diisobutyl ketone (DIBK); number of carbon atoms: 9; SP value: 7.8⟩, cyclohexanone ⟨number of carbon atoms: 6; SP value: 9.3⟩, and 4-hydroxy-4-methyl-pentan-2-one ⟨diacetone alcohol; number of carbon atoms: 6; SP value: 9.2⟩.

Although not restricted thereto, for example, one type or two or more types of the following various ethers can be cited as specific examples of an ether.

1,4-dioxane ⟨dioxane; SP value: 10⟩, 1,1-dimethyldiethyl ether ⟨diisopropyl ether; SP value: 6.9⟩, 2-ethoxyethanol ⟨ethyl cellosolve (EGMEE); SP value: 10.5⟩, 2-butoxyethanol ⟨butyl cellosolve (EGMBE); SP value: 9.5⟩, and methyl tert-butyl ether ⟨MTBE⟩.

Also, as the ether, a glycol ether can also be used.

Although not restricted thereto, for example, one type or two or more types of the following various glycol ethers can be cited as specific examples of the glycol ether.

1-methoxy-2-propanol ⟨propylene glycol monomethyl ether (PM); SP value: 10.2⟩, 2-(2-methoxyethoxy)ethanol ⟨methyl carbitol⟩, 2-(2-ethoxyethoxy)ethanol ⟨ethyl carbitol; SP value: 10.2⟩, 2-(2-butoxyethoxy)ethanol ⟨butyl carbitol; SP value: 10.2⟩, 2-[2-(2-methoxyethoxy) ethoxy]ethanol ⟨methyl triglycol⟩, 1-butoxy-2-propanol ⟨propylene glycol-1-monobutyl ether (PNB)⟩, 3-methoxy-3-methyl-1-butanol ⟨methyl methoxybutanol (MMB)⟩, 2-[2-(hexyloxy) ethoxy]ethanol ⟨hexyl diglycol⟩, 1-methoxy-2-propyl propanoate ⟨methotate⟩, and 1- or 2-(methoxymethylethoxy) propanol ⟨dipropylene glycol monomethyl ether (DPM), isomer mixture⟩.

Although not restricted thereto, for example, one type or two or more types of the following various esters can be cited as specific examples of an ester.

Ethyl acetate ⟨SP value: 9.1⟩, methyl acetate ⟨SP value: 9.6⟩, n-butyl acetate ⟨SP value: 8.5⟩, sec-butyl acetate ⟨SP value: 8.3⟩, 3-methoxybutyl acetate, pentyl ethanoate ⟨amyl acetate; SP value: 8.5⟩, propyl acetate ⟨n-propyl acetate; SP value: 8.8⟩, isopropyl ethanoate ⟨isopropyl acetate; SP value: 8.4⟩, (R)-ethyl-2-hydroxypropanoate ⟨ethyl lactate⟩, methyl-2-hydroxypropanoate ⟨methyl lactate⟩, and butyl-2-hydroxypropanoate ⟨butyl lactate⟩.

Also as the ester, a glycol ester can also be used.

Although not restricted thereto, for example, one type or two or more types of the following various glycol esters can be cited as specific examples of the glycol ester.

1-acetoxy-2-ethoxyethane ⟨ethylene glycol monoethyl ether acetate⟩, 1-methoxy-2-propanyl acetate ⟨propylene glycol monomethyl ether acetate (PGMEA)⟩, 2-(2-butoxyethoxy)ethyl acetate ⟨butyl carbitol acetate; SP value: 8.5⟩, and 2-(2-ethoxyethoxy)ethyl acetate ⟨ethyl carbitol acetate⟩.

The first solvent is excellent in dissolving ability with respect to the metal complex dye, the polyoxyethylene based compound, and the tackifier and can thus dissolve these components satisfactorily as mentioned above.

Hence, the dissolved metal complex dye, etc., can be suppressed effectively from precipitating during storage of the inkjet ink or causing cogation.

Among the above, as the ketone, a ketone with 3 to 5 carbon atoms and an SP value of not more than 9 is used favorably.

The ketone that satisfies these ranges of number of carbon atoms and SP value is especially excellent in dissolving ability with respect to the metal complex dye, the polyoxyethylene based compound, and the tackifier and can thus further improve the effect of suppressing these components from precipitating or causing cogation.

Among the various ketones given as examples above, for example, 2-pentanone ⟨MPK; number of carbon atoms: 5; SP value: 8.7⟩, 3-pentanone ⟨DEK; number of carbon atoms: 5; SP value: 8.8⟩, 3-methyl-2-butanone ⟨MIPK; number of carbon atoms: 5; SP value: 8.5⟩, etc., can be cited as ketones that satisfy these conditions.

Also, among the various ethers given as examples above, for example, 2-(2-ethoxyethoxy)ethanol ⟨ethyl carbitol; SP value: 10.2⟩, 1-methoxy-2-propanol ⟨propylene glycol monomethyl ether (PM); SP value: 10.2⟩, etc., can be cited as the ether.

Further, among the various esters given as examples above, for example, ethyl acetate ⟨SP value: 9.1⟩, etc., can be cited as the ester.

One type or two or more types of these first solvents can be used.

<Second Solvent>

As the second solvent to be used in combination with the first solvent, an alcohol that includes at least an alcohol with 1 to 3 carbon atoms and with which a solubility parameter (SP value) is not less than 11 is used.

Although not restricted thereto, for example, one type or two or more types of the following various alcohols can be cited as specific examples of such an alcohol.

Methanol ⟨methyl alcohol; number of carbon atoms: 1; SP value: 14.5 to 14.8⟩, ethanol ⟨ethyl alcohol; number of carbon atoms: 2; SP value: 12.7⟩, 1-propanol ⟨propyl alcohol; number of carbon atoms: 3; SP value: 11.97⟩, 2-propanol ⟨isopropyl alcohol (IPA); number of carbon atoms: 3; SP value: 11.5⟩, 1-butanol ⟨butyl alcohol; number of carbon atoms: 4; SP value: 11.4⟩, and 2-butanol ⟨sec-butyl alcohol; number of carbon atoms: 4; SP value: 11⟩.

These alcohols, especially when the inkjet ink is used in a thermal type inkjet printer and heated, volatilize and foam as a forming component of bubbles and function to form and discharge ink droplets of predetermined volume through a nozzle.

Also, by using these alcohols as the second solvent in combination, a material adaptability, that is, a material compatibility of the inkjet ink with a member forming the head, etc., of the inkjet printer, etc., can be improved.

Also, in particular, the alcohols with 1 to 3 carbon atoms are low in boiling point and high in volatility in comparison to other alcohols besides these with an SP value not less than 11 and can thus further improve the quick drying property of the inkjet ink after printing.

Therefore, although it is preferable to use the alcohol with 1 to 3 carbon atoms solely (including a case where two or more types of the alcohols with 1 to 3 carbon atoms are used in combination; the same applies hereinafter) as the second solvent, the alcohol with 1 to 3 carbon atoms may be used in combination with another alcohol besides it.

However, in a case of combined use, an amount of the alcohol with 1 to 3 carbon atoms is preferably not less than 70 mass % in a total amount of the second solvent such as not to compromise the quick drying property of the inkjet ink.

Also, an upper limit of the alcohol with 1 to 3 carbon atoms is 100 mass % from a standpoint of the quick drying property.

That is, as mentioned above, it is preferable for an entire amount of the second solvent to be the alcohol with 1 to 3 carbon atoms.

<Regarding the Amount of Solvent>

The amount of the first solvent in a total amount of the first solvent and the alcohol as the second solvent is preferably not less than 4 mass % and especially preferably not less than 5 mass % and preferably not more than 42 mass % and especially preferably not more than 40 mass %.

If the amount of the first solvent is less than this range, satisfactory dissolving ability with respect to the metal complex dye, etc., cannot be maintained and precipitation occurs easily during storage of the inkjet ink or cogation is caused easily during printing in some cases.

On the other hand, if the amount of the first solvent is greater than the range mentioned above, the amount of the second solvent becomes low relatively and therefore, the material compatibility of the inkjet ink becomes poor and various defects due to erosion and dissolution of a member constituting the head, etc., are caused in some cases.

That is, if a member constituting the head, etc., becomes eroded or dissolved and becomes mixed into the inkjet ink and, for example, precipitates as an insoluble component inside the nozzle, the discharge of the inkjet ink becomes unstable and nozzle clogging is caused to decrease the continuous printing performance in some cases.

Also, in some cases, the insoluble component obstructs the discharge of the ink droplets such that a trajectory of the discharged ink droplets changes or chipping or blurring of a character is caused thereby.

Further, in some cases, the precipitated insoluble component impedes the film of the tackifier from forming on the liquid surface inside the nozzle during the decap time and becomes a cause of decreasing the intermittent printing performance.

Also, in some cases, the amount of the alcohol as the second solvent that functions as the forming component of bubbles upon being heated in use in a thermal type inkjet printer becomes insufficient such that even if the inkjet ink is heated, bubbles cannot be formed satisfactory and appropriate ink droplets cannot be discharged.

On the other hand, by setting the amount of the first solvent to be within the range mentioned above, the solubility of the metal complex dye, etc., inside the inkjet ink can be improved to satisfactorily suppress precipitation and cogation from occurring.

Also, the material compatibility of the inkjet ink can be improved to satisfactorily suppress the occurrence of the various defects mentioned above due to erosion and dissolution of a member constituting the head, etc.

Further, when the inkjet ink is used in a thermal type inkjet printer and heated, bubbles can be formed satisfactorily to discharge appropriate ink droplets.

<Other Components>

In addition to the respective components described above, a binder resin may further be blended in the inkjet ink.

By blending the binder resin together with the polyoxyethylene based compound and the tackifier, the fixing property and the abrasion resistance, especially of a character formed on a surface of the corona-treated OPP mentioned above, etc., can be improved even further.

However, the binder resin becomes a cause of cogation as mentioned above and is preferably restricted to a small amount even when it is blended.

Even by blending at such a small amount, the fixing property and the abrasion resistance of a character can be improved by combined use with the polyoxyethylene based compound and the tackifier.

Specifically, an amount of the binder resin in the total amount of the inkjet ink is preferably not more than 5 mass % and more preferably not more than 2 mass %.

Especially in consideration of occurrence of cogation, etc., the amount of the binder resin is preferably 0 mass % even within the range mentioned above, that is, it is after all preferable for the binder resin not to be contained (excluded).

The inkjet ink of the present invention that contains the respective components described above can be used in the drop-on-demand type inkjet printer mentioned above. It can be used especially favorably in a drop-on-demand type inkjet printer that is of a thermal type.

EXAMPLES

Although the present invention shall now be described based on examples and comparative examples, the arrangement of the present invention is not necessarily restricted to these examples.

Example 1

The respective components indicated below were blended and thereafter filtered using a 5 μm membrane filter to prepare an inkjet ink.

TABLE 1

| Component | Mass % |
| --- | --- |
| Colorant | 9 |
| Polyoxyethylene based compound | 2 |
| Tackifier | 2 |
| First solvent (ketone) | 20 |
| Second solvent (alcohol) | 67 |
| Total amount | 100 |

The respective components in the table are as follows.

Colorant: Metal complex dye ⟨VALIFAST BLACK 3810 manufactured by Orient Chemical Industries Co., Ltd.⟩

Polyoxyethylene based compound: ADEKA PEG-1000 ⟨polyethylene glycol; number average molecular weight Mn: 1000⟩ manufactured by ADEKA Corp.

Tackifier: Terpene phenol resin ⟨YS Polyster T80 manufactured by Yasuhara Chemical Co., Ltd.; hydroxyl value: 60 mgKOH/g⟩

First solvent (ketone): 3-methyl-2-butanone ⟨methyl isopropyl ketone (MIPK); number of carbon atoms: 5; SP value: 8.5⟩

Second solvent: Ethanol ⟨ethyl alcohol; number of carbon atoms: 2; SP value: 12.7⟩

The amount of the polyoxyethylene based compound with respect to the amount of the metal complex dye was 22.2 mass % and the amount of the first solvent in the total amount of the first solvent and the second solvent was 23.0 mass %.

Example 2

An inkjet ink was prepared in the same manner as in Example 1 with the exception of blending, in place of ADEKA PEG-1000, the same amount of polyoxyethylene lauryl ether bridge 35⟨alcohol ethoxylate; number average molecular weight Mn: 1200⟩ manufactured by Junsei Chemical Co., Ltd. as the polyoxyethylene based compound.

The amount of the polyoxyethylene based compound with respect to the amount of the metal complex dye was 22.2 mass % and the amount of the first solvent in the total amount of the first solvent and the second solvent was 23.0 mass %.

Example 3

An inkjet ink was prepared in the same manner as in Example 1 with the exception of blending, in place of ADEKA PEG-1000, the same amount of ADEKA PLURONIC L-31 ⟨poloxamer; POE (3) POP (17); number average molecular weight Mn: 1100, POE content: 10%⟩ manufactured by ADEKA Corp. as the polyoxyethylene based compound.

The amount of the polyoxyethylene based compound with respect to the amount of the metal complex dye was 22.2 mass % and the amount of the first solvent in the total amount of the first solvent and the second solvent was 23.0 mass %.

Example 4

An inkjet ink was prepared in the same manner as in Example 1 with the exception of using 60 mass % of ethanol and 7 mass % of 2-propanol ⟨isopropyl alcohol (IPA); number of carbon atoms: 3; SP value: 11.5⟩ in combination as the second solvent.

The amount of the polyoxyethylene based compound with respect to the amount of the metal complex dye was 22.2 mass % and the amount of the first solvent in the total amount of the first solvent and the second solvent was 23.0 mass %.

Example 5

An inkjet ink was prepared in the same manner as in Example 1 with the exception of using 60 mass % of ethanol and 7 mass % of 1-butanol ⟨butyl alcohol; number of carbon atoms: 4; SP value: 11.4⟩ in combination as the second solvent.

The amount of the polyoxyethylene based compound with respect to the amount of the metal complex dye was 22.2 mass % and the amount of the first solvent in the total amount of the first solvent and the second solvent was 23.0 mass %.

Example 6

An inkjet ink was prepared in the same manner as in Example 1 with the exception of using 2 mass % of MIPK and 18 mass % of 2-(2-ethoxyethoxy)ethanol ⟨ethyl carbitol; SP value: 10.2⟩ in combination as the first solvent.

The amount of the polyoxyethylene based compound with respect to the amount of the metal complex dye was 22.2 mass % and the amount of the first solvent in the total amount of the first solvent and the second solvent was 23.0 mass %.

Example 7

An inkjet ink was prepared in the same manner as in Example 1 with the exception of using 2 mass % of MIPK and 18 mass % of 1-methoxy-2-propanol ⟨propylene glycol monomethyl ether (PM); SP value: 10.2⟩ in combination as the first solvent.

The amount of the polyoxyethylene based compound with respect to the amount of the metal complex dye was 22.2 mass % and the amount of the first solvent in the total amount of the first solvent and the second solvent was 23.0 mass %.

Example 8

An inkjet ink was prepared in the same manner as in Example 1 with the exception of using 2 mass % of MIPK and 18 mass % of ethyl acetate ⟨SP value: 9.1⟩ in combination as the first solvent.

The amount of the polyoxyethylene based compound with respect to the amount of the metal complex dye was 22.2 mass % and the amount of the first solvent in the total amount of the first solvent and the second solvent was 23.0 mass %.

Example 9

An inkjet ink was prepared in the same manner as in Example 1 with the exception of blending, in place of MIPK, the same amount of 2-butanone ⟨methyl ethyl ketone (MEK); number of carbon atoms: 4; SP value: 9.3⟩ as the first solvent.

The amount of the polyoxyethylene based compound with respect to the amount of the metal complex dye was 22.2 mass % and the amount of the first solvent in the total amount of the first solvent and the second solvent was 23.0 mass %.

Example 10

An inkjet ink was prepared in the same manner as in Example 1 with the exception of blending, in place of MIPK, the same amount of 2-(2-ethoxyethoxy)ethanol as the first solvent.

The amount of the polyoxyethylene based compound with respect to the amount of the metal complex dye was 22.2 mass % and the amount of the first solvent in the total amount of the first solvent and the second solvent was 23.0 mass %.

Example 11

An inkjet ink was prepared in the same manner as in Example 1 with the exception of blending, in place of MIPK, the same amount of 1-methoxy-2-propanol as the first solvent.

The amount of the polyoxyethylene based compound with respect to the amount of the metal complex dye was 22.2 mass % and the amount of the first solvent in the total amount of the first solvent and the second solvent was 23.0 mass %.

Example 12

An inkjet ink was prepared in the same manner as in Example 1 with the exception of blending, in place of MIPK, the same amount of ethyl acetate as the first solvent.

The amount of the polyoxyethylene based compound with respect to the amount of the metal complex dye was 22.2 mass % and the amount of the first solvent in the total amount of the first solvent and the second solvent was 23.0 mass %.

Example 13

An inkjet ink was prepared in the same manner as in Example 1 with the exception of blending, in place of ADEKA PEG-1000, the same amount of Toho Polyethylene Glycol 2000 〈number average molecular weight Mn: 2000〉 manufactured by TOHO Chemical Industry Co., Ltd. as the polyoxyethylene based compound.

The amount of the polyoxyethylene based compound with respect to the amount of the metal complex dye was 22.2 mass % and the amount of the first solvent in the total amount of the first solvent and the second solvent was 23.0 mass %.

Example 14

An inkjet ink was prepared in the same manner as in Example 1 with the exception of blending, in place of ADEKA PEG-1000, the same amount of DKS-NL15 〈number average molecular weight Mn: 2900〉 manufactured by DKS Co., Ltd. as the polyoxyethylene based compound.

The amount of the polyoxyethylene based compound with respect to the amount of the metal complex dye was 22.2 mass % and the amount of the first solvent in the total amount of the first solvent and the second solvent was 23.0 mass %.

Example 15

An inkjet ink was prepared in the same manner as in Example 1 with the exception of blending, in place of ADEKA PEG-1000, the same amount of ADEKA PLURONIC L-61 〈POE (5) POP (30); number average molecular weight Mn: 2000, POE content: 10%〉 manufactured by ADEKA Corp. as the polyoxyethylene based compound.

The amount of the polyoxyethylene based compound with respect to the amount of the metal complex dye was 22.2 mass % and the amount of the first solvent in the total amount of the first solvent and the second solvent was 23.0 mass %.

Example 16

An inkjet ink was prepared in the same manner as in Example 1 with the exception of blending, in place of ADEKA PEG-1000, the same amount of ADEKA PEG-600 〈number average molecular weight Mn: 600〉 manufactured by ADEKA Corp. as the polyoxyethylene based compound.

The amount of the polyoxyethylene based compound with respect to the amount of the metal complex dye was 22.2 mass % and the amount of the first solvent in the total amount of the first solvent and the second solvent was 23.0 mass %.

Example 17

An inkjet ink was prepared in the same manner as in Example 1 with the exception of blending, in place of ADEKA PEG-1000, the same amount of ADEKA PEG-400 〈number average molecular weight Mn: 400〉 manufactured by ADEKA Corp. as the polyoxyethylene based compound.

The amount of the polyoxyethylene based compound with respect to the amount of the metal complex dye was 22.2 mass % and the amount of the first solvent in the total amount of the first solvent and the second solvent was 23.0 mass %.

Example 18

An inkjet ink was prepared in the same manner as in Example 1 with the exception of blending, in place of ADEKA PEG-1000, the same amount of ADEKA PLURONIC L 101 (POE (8) POP (55)); number average molecular weight Mn: 3800, POE content: 10) manufactured by ADEKA Corp. as the polyoxyethylene based compound.

The amount of the polyoxyethylene based compound with respect to the amount of the metal complex dye was 22.2 mass % and the amount of the first solvent in the total amount of the first solvent and the second solvent was 23.0 mass %.

Example 19

An inkjet ink was prepared in the same manner as in Example 1 with the exception of blending, in place of ADEKA PEG-1000, the same amount of ADEKA PLURONIC L-121 〈POE (10) POP (65); number average molecular weight Mn: 4500, POE content: 10%〉 manufactured by ADEKA Corp. as the polyoxyethylene based compound.

The amount of the polyoxyethylene based compound with respect to the amount of the metal complex dye was 22.2 mass % and the amount of the first solvent in the total amount of the first solvent and the second solvent was 23.0 mass %.

Example 20

An inkjet ink was prepared in the same manner as in Example 1 with the exception of setting the amount of ADEKA PEG-1000 as the polyoxyethylene based compound to 0.2 mass % and setting the amount of ethanol as the second solvent to 68.8 mass %.

The amount of the polyoxyethylene based compound with respect to the amount of the metal complex dye was 2.2 mass % and the amount of the first solvent in the total amount of the first solvent and the second solvent was 22.5 mass %.

Example 21

An inkjet ink was prepared in the same manner as in Example 1 with the exception of setting the amount of ADEKA PEG-1000 as the polyoxyethylene based compound to 0.3 mass % and setting the amount of ethanol as the second solvent to 68.7 mass %.

The amount of the polyoxyethylene based compound with respect to the amount of the metal complex dye was 3.3 mass % and the amount of the first solvent in the total amount of the first solvent and the second solvent was 22.5 mass %.

Example 22

An inkjet ink was prepared in the same manner as in Example 1 with the exception of setting the amount of ADEKA PEG-1000 as the polyoxyethylene based compound to 4.5 mass % and setting the amount of ethanol as the second solvent to 64.5 mass %.

The amount of the polyoxyethylene based compound with respect to the amount of the metal complex dye was 50.0 mass % and the amount of the first solvent in the total amount of the first solvent and the second solvent was 23.7 mass %.

Example 23

An inkjet ink was prepared in the same manner as in Example 1 with the exception of setting the amount of ADEKA PEG-1000 as the polyoxyethylene based compound to 5 mass % and setting the amount of ethanol as the second solvent to 64 mass %.

The amount of the polyoxyethylene based compound with respect to the amount of the metal complex dye was 55.6 mass % and the amount of the first solvent in the total amount of the first solvent and the second solvent was 23.8 mass %.

Comparative Example 1

Although, in place of YS Polyster T80, the same amount of YS Polyster U130 ⟨terpene phenol resin; hydroxyl value: 25 mgKOH/g⟩ manufactured by Yasuhara Chemical Co., Ltd. was blended as the tackifier, an entire amount thereof could not be dissolved.

The preparation of an inkjet ink and subsequent tests were therefore abandoned.

The amount of the polyoxyethylene based compound with respect to the amount of the metal complex dye was 22.2 mass % and the amount of the first solvent in the total amount of the first solvent and the second solvent was 23.0 mass %.

Example 24

An inkjet ink was prepared in the same manner as in Example 1 with the exception of blending, in place of YS Polyster T80, the same amount of YS Polyster U115 ⟨terpene phenol resin; hydroxyl value: 30 mgKOH/g⟩ manufactured by Yasuhara Chemical Co., Ltd. as the tackifier.

The amount of the polyoxyethylene based compound with respect to the amount of the metal complex dye was 22.2 mass % and the amount of the first solvent in the total amount of the first solvent and the second solvent was 23.0 mass %.

Example 25

An inkjet ink was prepared in the same manner as in Example 1 with the exception of blending, in place of YS Polyster T80, the same amount of SYLVARES TP115 ⟨terpene phenol resin; hydroxyl value: 50 mgKOH/g⟩ manufactured by Arizona Chemical Ltd. as the tackifier.

The amount of the polyoxyethylene based compound with respect to the amount of the metal complex dye was 22.2 mass % and the amount of the first solvent in the total amount of the first solvent and the second solvent was 23.0 mass %.

Comparative Example 2

An inkjet ink was prepared in the same manner as in Example 1 with the exception of blending, in place of YS Polyster T80, the same amount of YS Polyster 5145 ⟨terpene phenol resin; hydroxyl value: 100 mgKOH/g⟩ manufactured by Yasuhara Chemical Co., Ltd. as the tackifier.

The amount of the polyoxyethylene based compound with respect to the amount of the metal complex dye was 22.2 mass % and the amount of the first solvent in the total amount of the first solvent and the second solvent was 23.0 mass %.

Example 26

An inkjet ink was prepared in the same manner as in Example 1 with the exception of setting the amount of MIPK as the first solvent to 4 mass % and setting the amount of ethanol as the second solvent to 83 mass %.

The amount of the polyoxyethylene based compound with respect to the amount of the metal complex dye was 22.2 mass % and the amount of the first solvent in the total amount of the first solvent and the second solvent was 4.6 mass %.

Example 27

An inkjet ink was prepared in the same manner as in Example 1 with the exception of setting the amount of MIPK as the first solvent to 5 mass % and setting the amount of ethanol as the second solvent to 82 mass %.

The amount of the polyoxyethylene based compound with respect to the amount of the metal complex dye was 22.2 mass % and the amount of the first solvent in the total amount of the first solvent and the second solvent was 5.7 mass %.

Example 28

An inkjet ink was prepared in the same manner as in Example 1 with the exception of setting the amount of MIPK as the first solvent to 32 mass % and setting the amount of ethanol as the second solvent to 55 mass %.

The amount of the polyoxyethylene based compound with respect to the amount of the metal complex dye was 22.2 mass % and the amount of the first solvent in the total amount of the first solvent and the second solvent was 36.8 mass %.

Example 29

An inkjet ink was prepared in the same manner as in Example 1 with the exception of setting the amount of MIPK as the first solvent to 36 mass % and setting the amount of ethanol as the second solvent to 51 mass %.

The amount of the polyoxyethylene based compound with respect to the amount of the metal complex dye was 22.2 mass % and the amount of the first solvent in the total amount of the first solvent and the second solvent was 41.4 mass %.

Example 30

An inkjet ink was prepared in the same manner as in Example 1 with the exception of setting the amount of YS Polyster T80 as the tackifier to 0.5 mass % and setting the amount of ethanol as the second solvent to 68.5 mass %.

The amount of the polyoxyethylene based compound with respect to the amount of the metal complex dye was 22.2 mass % and the amount of the first solvent in the total amount of the first solvent and the second solvent was 22.6 mass %.

Example 31

An inkjet ink was prepared in the same manner as in Example 1 with the exception of setting the amount of YS Polyster T80 as the tackifier to 1 mass % and setting the amount of ethanol as the second solvent to 68 mass %.

The amount of the polyoxyethylene based compound with respect to the amount of the metal complex dye was 22.2 mass % and the amount of the first solvent in the total amount of the first solvent and the second solvent was 22.7 mass %.

Example 32

An inkjet ink was prepared in the same manner as in Example 1 with the exception of setting the amount of YS Polyster T80 as the tackifier to 4 mass % and setting the amount of ethanol as the second solvent to 65 mass %.

The amount of the polyoxyethylene based compound with respect to the amount of the metal complex dye was 22.2 mass % and the amount of the first solvent in the total amount of the first solvent and the second solvent was 23.5 mass %.

Example 33

An inkjet ink was prepared in the same manner as in Example 1 with the exception of setting the amount of YS Polyster T80 as the tackifier to 5 mass % and setting the amount of ethanol as the second solvent to 64 mass %.

The amount of the polyoxyethylene based compound with respect to the amount of the metal complex dye was 22.2 mass % and the amount of the first solvent in the total amount of the first solvent and the second solvent was 23.8 mass %.

Comparative Example 3

An inkjet ink was prepared in the same manner as in Example 1 with the exception of blending, as the colorant, the same amount of an oil-soluble dye ⟨OIL BLACK 860 manufactured by Orient Chemical Industries Co., Ltd.⟩ that is not a metal complex dye.

The amount of the polyoxyethylene based compound with respect to the amount of the oil-soluble dye was 22.2 mass % and the amount of the first solvent in the total amount of the first solvent and the second solvent was 23.0 mass %.

Comparative Example 4

An inkjet ink was prepared in the same manner as in Example 1 with the exception of setting the amount of MIPK as the first solvent to 87 mass % and not blending ethanol as the second solvent.

The amount of the polyoxyethylene based compound with respect to the amount of the metal complex dye was 22.2 mass % and the amount of the first solvent in the total amount of the first solvent and the second solvent was 100.0 mass %.

Comparative Example 5

An inkjet ink was prepared in the same manner as in Example 1 with the exception of setting the amount of ethanol as the second solvent to 87 mass % and not blending MIPK as the first solvent.

The amount of the polyoxyethylene based compound with respect to the amount of the metal complex dye was 22.2 mass % and the amount of the first solvent in the total amount of the first solvent and the second solvent was 0 mass %.

Comparative Example 6

An inkjet ink was prepared in the same manner as in Example 1 with the exception of blending, in place of YS Polyster T80, 10 mass % of YS Polyster 5145 ⟨terpene phenol resin; hydroxyl value: 100 mgKOH/g⟩ manufactured by Yasuhara Chemical Co., Ltd. as the tackifier, setting the amount of ethanol as the second solvent to 79%, and not blending MIPK as the first solvent.

The amount of the polyoxyethylene based compound with respect to the amount of the metal complex dye was 22.2 mass % and the amount of the first solvent in the total amount of the first solvent and the second solvent was 0 mass %.

Comparative Example 7

An inkjet ink was prepared in the same manner as in Example 1 with the exception of blending, in place of ADEKA PEG-1000 as the polyoxyethylene based compound, the same amount of sorbitan lauryl ester ⟨ADEKA ESTOL S-20 manufactured by ADEKA Corp.⟩.

The amount of the polyoxyethylene based compound with respect to the amount of the metal complex dye was 0 mass % and the amount of the first solvent in the total amount of the first solvent and the second solvent was 23.0 mass %.

Comparative Example 8

An inkjet ink was prepared in the same manner as in Example 1 with the exception of blending, in place of ADEKA PEG-1000 as the polyoxyethylene based compound, the same amount of an acetylene glycol ⟨OLFINE (registered trademark) E1020 manufactured by Nissin Chemical Industry Co., Ltd.⟩.

The amount of the polyoxyethylene based compound with respect to the amount of the metal complex dye was 0 mass % and the amount of the first solvent in the total amount of the first solvent and the second solvent was 23.0 mass %.

Comparative Example 9

An inkjet ink was prepared in the same manner as in Example 1 with the exception of blending, in place of ADEKA PEG-1000 as the polyoxyethylene based compound, the same amount of an acrylic resin 〈JONCRYL 682 manufactured by BASF Japan Ltd.〉 as a binder resin.

The amount of the polyoxyethylene based compound with respect to the amount of the metal complex dye was 0 mass % and the amount of the first solvent in the total amount of the first solvent and the second solvent was 23.0 mass %.

Comparative Example 10

An inkjet ink was prepared in the same manner as in Example 1 with the exception of not blending YS Polyster T80 as the tackifier, setting the amount of MIPK as the first solvent to 18 mass %, and using 69 mass % of ethanol and 2 mass % of 1-butanol in combination as the second solvent.

<Continuous Printing Performance Test>

Using a drop-on-demand type inkjet printer of a thermal type, solid images each of 0.5 inches×0.5 inches were printed continuously at a resolution of 300×300 dpi on a surface of a corona-treated OPP with each of the inkjet inks prepared in the Examples and Comparative Examples.

The printed solid images were then observed, the number of times of printing for which chipping or omission due to a discharge defect of the inkjet ink caused mainly by cogation, etc., did not occur was recorded and the continuous printing performance was evaluated by the following standards.

○: Not less than 30,000 times.

Δ: Not less than 10,000 times but less than 30,000 times.

x: Less than 10,000 times.

<Abrasion Resistance Test>

Using the same inkjet printer as that used in the continuous printing performance test, a barcode of 0.2 pt 〈line width: 0.07 mm〉 was printed on a surface of a corona-treated OPP with each of the inkjet inks prepared in the Examples and Comparative Examples.

Next, changes when the printed barcode was rubbed for 10 reciprocations with a cotton swab were observed and the abrasion resistance was evaluated by the following standards.

○: No changes were seen in the barcode even when rubbed.

Δ: Although when rubbed, elongation was seen in a portion of the barcode, chipping was not seen.

x: Elongation and chipping were seen at least in a portion of the barcode when rubbed.

<Quick Drying Property Test>

Using the same inkjet printer as that used in the continuous printing performance test, a character of approximately 8.5 pt was printed at a resolution of 300×300 dpi on a surface of a corona-treated OPP with each of the inkjet inks prepared in the Examples and Comparative Examples.

Next, the printed character was dried for a certain time until the character does not become removed even when rubbed with a cotton swab and the time required for this was recorded and the quick drying property was evaluated by the following standards.

○: Less than 10 seconds.

Δ: Not less than 10 seconds but less than 15 seconds.

x: Not less than 15 seconds.

<Intermittent Printing Performance Test>

Using the same inkjet printer as that used in the continuous printing performance test, a character of approximately 8.5 pt was printed at a resolution of 300×300 dpi on a surface of a corona-treated OPP with each of the inkjet inks prepared in the Examples and Comparative Examples.

Next, the inkjet printer was left to stand in a decapped state for a certain time under an environment of ordinary temperature and low humidity (25° C., 30%) and then printed again to record the standing time during which clear character without blur, etc., could be printed and the intermittent printing performance was evaluated by the following standards.

○: Not less than 10 minutes.

Δ: Not less than 5 minutes but less than 10 minutes.

x: Less than 5 minutes.

<Storage Stability Test>

Changes in state after 1 day and after 2 days when each of the inkjet inks prepared in the Examples and Comparative Examples was placed and sealed in a screw cap bottle and thereupon contained inside a freezer and stored at −20° C. were observed. Storage stability was then evaluated by the following standards.

○: No changes were seen at all even after 1 day and even after 2 days.

Δ: Although no changes were seen after 1 day, precipitation was seen after 2 days.

x: Precipitation was seen after 1 day.

<Material Compatibility Test>

Each of the inkjet inks prepared in the Examples and Comparative Examples was filled into an ink cartridge, stored at 45° C., and every other week, a character was printed upon installing the stored ink cartridge in an inkjet printer. Presence/non-presence of chipping or blurring of the character caused by the material compatibility being poor was then observed and the material compatibility was evaluated by the following standards.

○: No chipping or blurring was seen even in observations on the 6th week and onward.

Δ: Although chipping or blurring was seen in observation on the 5th week, no chipping or blurring was seen up to the 4th week.

x: Chipping or blurring was seen by the 4th week or earlier.

The results of the above are shown in Table 2 to Table 10. Here, in each table, the symbols in the column of the polyoxyethylene based compound are as follows.

PEG: polyethylene glycol

AE: alcohol ethoxylate

PLX: poloxamer

TABLE 2

| | | Example 1 | Example 2 | Example 3 | Example 4 | Example 5 |
|---|---|---|---|---|---|---|
| Colorant | Metal complex dye (mass %) | 9 | 9 | 9 | 9 | 9 |
| | Oil-soluble dye (mass %) | — | — | — | — | — |
| Binder | Polyoxyethylene based compound — Type | PEG | AE | PLX | PEG | PEG |
| | Number average molecular weight Mn | 1000 | 1200 | 1100 | 1000 | 1000 |
| | Mass % | 2 | 2 | 2 | 2 | 2 |
| | Mass % (vs Colorant) | 22.2 | 22.2 | 22.2 | 22.2 | 22.2 |
| | Sorbitan lauryl ester (mass %) | — | — | — | — | — |
| | Acetylene glycol (mass %) | — | — | — | — | — |
| | Acrylic resin (mass %) | — | — | — | — | — |
| Tackifier | Hydroxyl value (mgKOH/g) | 60 | 60 | 60 | 60 | 60 |
| | Mass % | 2 | 2 | 2 | 2 | 2 |
| Solvent | First solvent: SP value — Ketone MIPK: 8.5 | 20 | 20 | 20 | 20 | 20 |
| | MEK: 9.3 | — | — | — | — | — |
| | Ethyl carbitol: 10.2 | — | — | — | — | — |
| | PM: 10.2 | — | — | — | — | — |
| | Ethyl acetate: 9.1 | — | — | — | — | — |
| | Second solvent: SP value — Ethanol: 12.7 | 67 | 67 | 67 | 60 | 60 |
| | 2-propanol: 11.5 | — | — | — | 7 | — |
| | 1-butanol: 11.4 | — | — | — | — | 7 |
| | Amount of first solvent (mass %) | 23.0 | 23.0 | 23.0 | 23.0 | 23.0 |
| Evaluation | Continuous printing property | ○ | ○ | ○ | ○ | ○ |
| | Abrasion resistance | ○ | ○ | ○ | ○ | ○ |
| | Quick drying property | ○ | ○ | ○ | ○ | ○ |
| | Intermittent printing performance | ○ | ○ | ○ | ○ | ○ |
| | Storage stability | ○ | ○ | ○ | ○ | ○ |
| | Material compatibility | ○ | ○ | ○ | ○ | ○ |

TABLE 3

| | | Example 6 | Example 7 | Example 8 | Example 9 | Example 10 |
|---|---|---|---|---|---|---|
| Colorant | Metal complex dye (mass %) | 9 | 9 | 9 | 9 | 9 |
| | Oil-soluble dye (mass %) | — | — | — | — | — |
| Binder | Polyoxyethylene based compound — Type | PEG | PEG | PEG | PEG | PEG |
| | Number average molecular weight Mn | 1000 | 1000 | 1000 | 1000 | 1000 |
| | Mass % | 2 | 2 | 2 | 2 | 2 |
| | Mass % (vs Colorant) | 22.2 | 22.2 | 22.2 | 22.2 | 22.2 |
| | Sorbitan lauryl ester (mass %) | — | — | — | — | — |
| | Acetylene glycol (mass %) | — | — | — | — | — |
| | Acrylic resin (mass %) | — | — | — | — | — |
| Tackifier | Hydroxyl value (mgKOH/g) | 60 | 60 | 60 | 60 | 60 |
| | Mass % | 2 | 2 | 2 | 2 | 2 |
| Solvent | First solvent: SP value — Ketone MIPK: 8.5 | 2 | 2 | 2 | — | — |
| | MEK: 9.3 | — | — | — | 20 | — |
| | Ethyl carbitol: 10.2 | 18 | — | — | — | 20 |
| | PM: 10.2 | — | 18 | — | — | — |
| | Ethyl acetate: 9.1 | — | — | 18 | — | — |
| | Second solvent: SP value — Ethanol: 12.7 | 67 | 67 | 67 | 67 | 67 |
| | 2-propanol: 11.5 | — | — | — | — | — |
| | 1-butanol: 11.4 | — | — | — | — | — |
| | Amount of first solvent (mass %) | 23.0 | 23.0 | 23.0 | 23.0 | 23.0 |
| Evaluation | Continuous printing property | ○ | ○ | ○ | ○ | ○ |
| | Abrasion resistance | ○ | ○ | ○ | ○ | ○ |
| | Quick drying property | ○ | ○ | ○ | ○ | ○ |
| | Intermittent printing performance | ○ | ○ | ○ | ○ | ○ |
| | Storage stability | ○ | ○ | ○ | ○ | ○ |
| | Material compatibility | ○ | ○ | ○ | ○ | ○ |

TABLE 4

|  |  |  | Example 11 | Example 12 | Example 13 | Example 14 | Example 15 |
|---|---|---|---|---|---|---|---|
| Colorant | Metal complex dye (mass %) |  | 9 | 9 | 9 | 9 | 9 |
|  | Oil-soluble dye (mass %) |  | — | — | — | — | — |
| Binder | Polyoxyethylene based compound | Type | PEG | PEG | PEG | AE | PLX |
|  |  | Number average molecular weight Mn | 1000 | 1000 | 2000 | 2900 | 2000 |
|  |  | Mass % | 2 | 2 | 2 | 2 | 2 |
|  |  | Mass % (vs Colorant) | 22.2 | 22.2 | 22.2 | 22.2 | 22.2 |
|  | Sorbitan lauryl ester (mass %) |  | — | — | — | — | — |
|  | Acetylene glycol (mass %) |  | — | — | — | — | — |
|  | Acrylic resin (mass %) |  | — | — | — | — | — |
| Tackifier | Hydroxyl value (mgKOH/g) |  | 60 | 60 | 60 | 60 | 60 |
|  | Mass % |  | 2 | 2 | 2 | 2 | 2 |
| Solvent | First solvent: SP value | Ketone MIPK: 8.5 | — | — | 20 | 20 | 20 |
|  |  | MEK: 9.3 | — | — | — | — | — |
|  |  | Ethyl carbitol: 10.2 | — | — | — | — | — |
|  |  | PM: 10.2 | 20 | — | — | — | — |
|  |  | Ethyl acetate: 9.1 | — | 20 | — | — | — |
|  | Second solvent: SP value | Ethanol: 12.7 | 67 | 67 | 67 | 67 | 67 |
|  |  | 2-propanol: 11.5 | — | — | — | — | — |
|  |  | 1-butanol: 11.4 | — | — | — | — | — |
|  | Amount of first solvent (mass %) |  | 23.0 | 23.0 | 23.0 | 23.0 | 23.0 |
| Evaluation | Continuous printing property |  | ○ | ○ | ○ | ○ | ○ |
|  | Abrasion resistance |  | ○ | ○ | ○ | ○ | ○ |
|  | Quick drying property |  | ○ | ○ | ○ | ○ | ○ |
|  | Intermittent printing performance |  | ○ | ○ | ○ | ○ | ○ |
|  | Storage stability |  | ○ | ○ | ○ | ○ | ○ |
|  | Material compatibility |  | ○ | ○ | ○ | ○ | ○ |

TABLE 5

|  |  |  | Example 16 | Example 17 | Example 18 | Example 19 | Example 20 |
|---|---|---|---|---|---|---|---|
| Colorant | Metal complex dye (mass %) |  | 9 | 9 | 9 | 9 | 9 |
|  | Oil-soluble dye (mass %) |  | — | — | — | — | — |
| Binder | Polyoxyethylene based compound | Type | PEG | PEG | PLX | PLX | PEG |
|  |  | Number average molecular weight Mn | 600 | 400 | 3800 | 4500 | 1000 |
|  |  | Mass % | 2 | 2 | 2 | 2 | 0.2 |
|  |  | Mass % (vs Colorant) | 22.2 | 22.2 | 22.2 | 22.2 | 2.2 |
|  | Sorbitan lauryl ester (mass %) |  | — | — | — | — | — |
|  | Acetylene glycol (mass %) |  | — | — | — | — | — |
|  | Acrylic resin (mass %) |  | — | — | — | — | — |
| Tackifier | Hydroxyl value (mgKOH/g) |  | 60 | 60 | 60 | 60 | 60 |
|  | Mass % |  | 2 | 2 | 2 | 2 | 2 |
| Solvent | First solvent: SP value | Ketone MIPK: 8.5 | 20 | 20 | 20 | 20 | 20 |
|  |  | MEK: 9.3 | — | — | — | — | — |
|  |  | Ethyl carbitol: 10.2 | — | — | — | — | — |
|  |  | PM: 10.2 | — | — | — | — | — |
|  |  | Ethyl acetate: 9.1 | — | — | — | — | — |
|  | Second solvent: SP value | Ethanol: 12.7 | 67 | 67 | 67 | 67 | 68.8 |
|  |  | 2-propanol: 11.5 | — | — | — | — | — |
|  |  | 1-butanol: 11.4 | — | — | — | — | — |
|  | Amount of first solvent (mass %) |  | 23.0 | 23.0 | 23.0 | 23.0 | 22.5 |
| Evaluation | Continuous printing property |  | ○ | ○ | ○ | ○ | ○ |
|  | Abrasion resistance |  | ○ | ○ | ○ | ○ | Δ |
|  | Quick drying property |  | Δ | Δ | ○ | ○ | ○ |
|  | Intermittent printing performance |  | ○ | ○ | ○ | ○ | ○ |
|  | Storage stability |  | ○ | ○ | ○ | Δ | ○ |
|  | Material compatibility |  | ○ | ○ | ○ | ○ | ○ |

TABLE 6

|  |  |  | Example 21 | Example 22 | Example 23 | Comparative Example 1 | Example 24 |
|---|---|---|---|---|---|---|---|
| Colorant | Metal complex dye (mass %) | | 9 | 9 | 9 | 9 | 9 |
|  | Oil-soluble dye (mass %) | | — | — | — | — | — |
| Binder | Polyoxyethylene based compound | Type | PEG 1000 | PEG 1000 | PEG 1000 | PEG 1000 | PEG 1000 |
|  |  | Number average molecular weight Mn |  |  |  |  |  |
|  |  | Mass % | 0.3 | 4.5 | 5 | 2 | 2 |
|  |  | Mass % (vs Colorant) | 3.3 | 50.0 | 55.6 | 22.2 | 22.2 |
|  | Sorbitan lauryl ester (mass %) | | — | — | — | — | — |
|  | Acetylene glycol (mass %) | | — | — | — | — | — |
|  | Acrylic resin (mass %) | | — | — | — | — | — |
| Tackifier | Hydroxyl value (mgKOH/g) | | 60 | 60 | 60 | 25 | 30 |
|  | Mass % | | 2 | 2 | 2 | 2 | 2 |
| Solvent | First solvent: SP value | Ketone MIPK: 8.5 | 20 | 20 | 20 | 20 | 20 |
|  |  | MEK: 9.3 | — | — | — | — | — |
|  |  | Ethyl carbitol: 10.2 | — | — | — | — | — |
|  |  | PM: 10.2 | — | — | — | — | — |
|  |  | Ethyl acetate: 9.1 | — | — | — | — | — |
|  | Second solvent: SP value | Ethanol: 12.7 | 68.7 | 64.5 | 64 | 67 | 67 |
|  |  | 2-propanol: 11.5 | — | — | — | — | — |
|  |  | 1-butanol: 11.4 | — | — | — | — | — |
|  | Amount of first solvent (mass %) | | 22.5 | 23.7 | 23.8 | 23.0 | 23.0 |
| Evaluation | Continuous printing property | | ○ | ○ | ○ | — | ○ |
|  | Abrasion resistance | | ○ | ○ | △ | — | ○ |
|  | Quick drying property | | ○ | ○ | ○ | — | ○ |
|  | Intermittent printing performance | | ○ | ○ | ○ | — | ○ |
|  | Storage stability | | ○ | ○ | ○ | — | ○ |
|  | Material compatibility | | ○ | ○ | ○ | — | ○ |

TABLE 7

|  |  |  | Example 25 | Comparative Example 2 | Example 26 | Example 27 | Example 28 |
|---|---|---|---|---|---|---|---|
| Colorant | Metal complex dye (mass %) | | 9 | 9 | 9 | 9 | 9 |
|  | Oil-soluble dye (mass %) | | — | — | — | — | — |
| Binder | Polyoxyethylene based compound | Type | PEG 1000 | PEG 1000 | PEG 1000 | PEG 1000 | PEG 1000 |
|  |  | Number average molecular weight Mn |  |  |  |  |  |
|  |  | Mass % | 2 | 2 | 2 | 2 | 2 |
|  |  | Mass % (vs Colorant) | 22.2 | 22.2 | 22.2 | 22.2 | 22.2 |
|  | Sorbitan lauryl ester (mass %) | | — | — | — | — | — |
|  | Acetylene glycol (mass %) | | — | — | — | — | — |
|  | Acrylic resin (mass %) | | — | — | — | — | — |
| Tackifier | Hydroxyl value (mgKOH/g) | | 50 | 100 | 60 | 60 | 60 |
|  | Mass % | | 2 | 2 | 2 | 2 | 2 |
| Solvent | First solvent: SP value | Ketone MIPK: 8.5 | 20 | 20 | 4 | 5 | 32 |
|  |  | MEK: 9.3 | — | — | — | — | — |
|  |  | Ethyl carbitol: 10.2 | — | — | — | — | — |
|  |  | PM: 10.2 | — | — | — | — | — |
|  |  | Ethyl acetate: 9.1 | — | — | — | — | — |
|  | Second solvent: SP value | Ethanol: 12.7 | 67 | 67 | 83 | 82 | 55 |
|  |  | 2-propanol: 11.5 | — | — | — | — | — |
|  |  | 1-butanol: 11.4 | — | — | — | — | — |
|  | Amount of first solvent (mass %) | | 23.0 | 23.0 | 4.6 | 5.7 | 36.8 |
| Evaluation | Continuous printing property | | ○ | ○ | △ | ○ | ○ |
|  | Abrasion resistance | | ○ | ○ | ○ | ○ | ○ |
|  | Quick drying property | | ○ | ○ | ○ | ○ | ○ |
|  | Intermittent printing performance | | ○ | x | ○ | ○ | ○ |
|  | Storage stability | | ○ | ○ | △ | ○ | ○ |
|  | Material compatibility | | ○ | ○ | ○ | ○ | ○ |

TABLE 8

|  |  | Example 29 | Example 30 | Example 31 | Example 32 | Example 33 |
|---|---|---|---|---|---|---|
| Colorant | Metal complex dye (mass %) | 9 | 9 | 9 | 9 | 9 |
|  | Oil-soluble dye (mass %) | — | — | — | — | — |
| Binder | Polyoxyethylene based compound | Type | PEG | PEG | PEG | PEG | PEG |
|  |  | Number average molecular weight Mn | 1000 | 1000 | 1000 | 1000 | 1000 |
|  |  | Mass % | 2 | 2 | 2 | 2 | 2 |
|  |  | Mass % (vs Colorant) | 22.2 | 22.2 | 22.2 | 22.2 | 22.2 |
|  | Sorbitan lauryl ester (mass %) | — | — | — | — | — |
|  | Acetylene glycol (mass %) | — | — | — | — | — |
|  | Acrylic resin (mass %) | — | — | — | — | — |
| Tackifier | Hydroxyl value (mgKOH/g) | 60 | 60 | 60 | 60 | 60 |
|  | Mass % | 2 | 0.5 | 1 | 4 | 5 |
| Solvent | First solvent: SP value | Ketone MIPK: 8.5 | 36 | 20 | 20 | 20 | 20 |
|  |  | MEK: 9.3 | — | — | — | — | — |
|  |  | Ethyl carbitol: 10.2 | — | — | — | — | — |
|  |  | PM: 10.2 | — | — | — | — | — |
|  |  | Ethyl acetate: 9.1 | — | — | — | — | — |
|  | Second solvent: SP value | Ethanol: 12.7 | 51 | 68.5 | 68 | 65 | 64 |
|  |  | 2-propanol: 11.5 | — | — | — | — | — |
|  |  | 1-butanol: 11.4 | — | — | — | — | — |
|  | Amount of first solvent (mass %) | 41.4 | 22.6 | 22.7 | 23.5 | 23.8 |
| Evaluation | Continuous printing property | Δ | ○ | ○ | ○ | Δ |
|  | Abrasion resistance | ○ | ○ | ○ | ○ | ○ |
|  | Quick drying property | ○ | ○ | ○ | ○ | Δ |
|  | Intermittent printing performance | ○ | Δ | ○ | ○ | ○ |
|  | Storage stability | ○ | ○ | ○ | ○ | ○ |
|  | Material compatibility | Δ | ○ | ○ | ○ | ○ |

TABLE 9

|  |  | Comparative Example 3 | Comparative Example 4 | Comparative Example 5 | Comparative Example 6 |
|---|---|---|---|---|---|
| Colorant | Metal complex dye (mass %) | — | 9 | 9 | 9 |
|  | Oil-soluble dye (mass %) | 9 | — | — | — |
| Binder | Polyoxyethylene based compound | Type | PEG | PEG | PEG | PEG |
|  |  | Number average molecular weight Mn | 1000 | 1000 | 1000 | 1000 |
|  |  | Mass % | 2 | 2 | 2 | 2 |
|  |  | Mass % (vs Colorant) | 22.2 | 22.2 | 22.2 | 22.2 |
|  | Sorbitan lauryl ester (mass %) | — | — | — | — |
|  | Acetylene glycol (mass %) | — | — | — | — |
|  | Acrylic resin (mass %) | — | — | — | — |
| Tackifier | Hydroxyl value (mgKOH/g) | 60 | 60 | 60 | 100 |
|  | Mass % | 2 | 2 | 2 | 10 |
| Solvent | First solvent: SP value | Ketone MIPK: 8.5 | 20 | 87 | — | — |
|  |  | MEK: 9.3 | — | — | — | — |
|  |  | Ethyl carbitol: 10.2 | — | — | — | — |
|  |  | PM: 10.2 | — | — | — | — |
|  |  | Ethyl acetate: 9.1 | — | — | — | — |
|  | Second solvent: SP value | Ethanol: 12.7 | 67 | — | 87 | 79 |
|  |  | 2-propanol: 11.5 | — | — | — | — |
|  |  | 1-butanol: 11.4 | — | — | — | — |
|  | Amount of first solvent (mass %) | 23.0 | 100.0 | — | — |
| Evaluation | Continuous printing property | ○ | x | x | x |
|  | Abrasion resistance | x | ○ | ○ | x |
|  | Quick drying property | ○ | ○ | ○ | x |
|  | Intermittent printing performance | ○ | x | x | ○ |
|  | Storage stability | ○ | ○ | x | ○ |
|  | Material compatibility | ○ | x | ○ | ○ |

TABLE 10

| | | | Comparative Example 7 | Comparative Example 8 | Comparative Example 9 | Comparative Example 10 |
|---|---|---|---|---|---|---|
| Colorant | Metal complex dye (mass %) | | 9 | 9 | 9 | 9 |
| | Oil-soluble dye (mass %) | | — | — | — | — |
| Binder | Polyoxyethylene based compound | Type | — | — | — | PEG |
| | | Number average molecular weight Mn | — | — | — | 1000 |
| | | Mass % | — | — | — | 2 |
| | | Mass % (vs Colorant) | — | — | — | 22.2 |
| | Sorbitan lauryl ester (mass %) | | 2 | — | — | — |
| | Acetylene glycol (mass %) | | — | 2 | — | — |
| | Acrylic resin (mass %) | | — | — | 2 | — |
| Tackifier | Hydroxyl value (mgKOH/g) | | 60 | 60 | 60 | — |
| | Mass % | | 2 | 2 | 2 | — |
| Solvent | First solvent: SP value | Ketone MIPK: 8.5 | 20 | 20 | 20 | 18 |
| | | MEK: 9.3 | — | — | — | — |
| | | Ethyl carbitol: 10.2 | — | — | — | — |
| | | PM: 10.2 | — | — | — | — |
| | | Ethyl acetate: 9.1 | — | — | — | — |
| | Second solvent: SP value | Ethanol: 12.7 | 67 | 67 | 67 | 69 |
| | | 2-propanol: 11.5 | — | — | — | — |
| | | 1-butanol: 11.4 | — | — | — | 2 |
| | Amount of first solvent (mass %) | | 23.0 | 23.0 | 23.0 | 20.2 |
| Evaluation | Continuous printing property | | ○ | ○ | x | ○ |
| | Abrasion resistance | | x | x | ○ | ○ |
| | Quick drying property | | ○ | ○ | ○ | ○ |
| | Intermittent printing performance | | ○ | ○ | x | x |
| | Storage stability | | ○ | ○ | ○ | ○ |
| | Material compatibility | | ○ | ○ | ○ | ○ |

From the results of Examples 1 to 33 and Comparative Examples 1 to 3 and 6 to 10 in Table 2 to Table 10, it was found that the colorant must contain a metal complex dye, a polyoxyethylene based compound must be used as a binder, a tackifier must further be contained, and a terpene phenol resin and/or a rosin ester with which the hydroxyl value is 30 to 70 mgKOH/g must be used as the tackifier.

From the results of Examples 1 to 33 and Comparative Examples 4 to 6, it was found that a first solvent of at least one type selected from a group consisting of ketones, ethers, and esters and with which the SP value is less than 11 and a second solvent being an alcohol including at least an alcohol with 1 to 3 carbon atoms and with which the SP value is not less than 11 must be used in combination as a solvent.

From the results of Examples 1 to 3 and 13 to 19, it was found that a polyethylene glycol, an alcohol ethoxylate, or a poloxamer can be used as the polyoxyethylene based compound, the number average molecular weight Mn of the polyoxyethylene based compound must be not less than 200 and even then, is preferably not less than 400, more preferably not less than 600, and especially preferably not less than 800, and yet even in the range mentioned above, the number average molecular weight Mn is preferably not more than 5000 and especially preferably not more than 4000.

From the results of Examples 1 and 20 to 23, it was found that the amount of the polyoxyethylene based compound with respect to the amount of the metal complex dye is preferably not less than 2 mass % and especially preferably not less than 3 mass % and preferably not more than 60 mass % and especially preferably not more than 55 mass %.

From the results of Examples 1 and 26 to 29, it was found that the amount of the first solvent in the total amount of the first solvent and the second solvent is preferably not less than 4 mass % and especially preferably not less than 5 mass % and preferably not more than 42 mass % and especially preferably not more than 40 mass %.

Further, from the results of Examples 1 and 30 to 33, it was found that the amount of the tackifier in the total amount of the inkjet ink is preferably not less than 0.5 mass % and especially preferably not less than 1 mass % and preferably not more than 5 mass % and especially preferably not more than 4 mass %.

The present application corresponds to Japanese Patent Application No. 2019-227263 filed on Dec. 17, 2019 in the Japan Patent Office, and the entire disclosure of this application is individually incorporated herein by reference.

While preferred embodiments of the present invention were described in detail above, these are merely specific examples used to clarify the technical contents of the present invention and the present invention should not be interpreted as being limited to these specific examples and the scope of the present invention is limited only by the appended claims.

What is claimed is:

1. An inkjet ink comprising:

a metal complex dye;

a polyoxyethylene based compound as a binder of at least one type selected from a group consisting of polyoxyalkylene glycols and polyoxyalkylene alkyl ethers and with which a number average molecular weight Mn is not less than 800 and not more than 4000;

a tackifier of at least one type selected from a group consisting of terpene phenol resins and rosin esters and with which a hydroxyl value is not less than 30 mgKOH/g and not more than 70 mgKOH/g;

a first solvent of at least one type selected from a group consisting of ketones, ethers, and esters and with which a solubility parameter (SP value) is less than 11;

a second solvent being an alcohol including at least an alcohol with 1 to 3 carbon atoms and with which the solubility parameter (SP value) is not less than 11;

wherein an amount of the polyoxyethylene based compound is not less than 3 mass % and not more than 55 mass % with respect to an amount of the metal complex dye, the inkjet ink excluding a binder resin.

2. The inkjet ink according to claim 1, wherein an amount of the tackifier is not less than 0.5 mass % and not more than 5 mass % in a total amount of the inkjet ink.

3. The inkjet ink according to claim 1, wherein an amount of the first solvent is not less than 4 mass % and not more than 42 mass % in a total amount of the first solvent and the second solvent.

4. The inkjet ink according to claim 1, wherein an amount of the metal complex dye is not less than 5 mass % and not more than 15 mass % in a total amount of the inkjet ink.

5. The inkjet ink according to claim 1, wherein an amount of the metal complex dye is not less than 7 mass % and not more than 12 mass % in a total amount of the inkjet ink, an amount of the polyoxyethylene based compound is not less than 3 mass % and not more than 55 mass % with respect to the amount of the metal complex dye, an amount of the tackifier is not less than 1 mass % and not more than 4 mass % in a total amount of the inkjet ink, and an amount of the first solvent is not less than 5 mass % and not more than 40 mass % in a total amount of the first solvent and the second solvent.

* * * * *